(12) United States Patent
Sakai (10) Patent No.: US 7,821,882 B2
(45) Date of Patent: Oct. 26, 2010

(54) RECORDING AND REPRODUCING APPARATUS AND RECORDING METHOD

(75) Inventor: Manabu Sakai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 962 days.

(21) Appl. No.: 11/553,735

(22) Filed: Oct. 27, 2006

(65) Prior Publication Data

US 2007/0097800 A1    May 3, 2007

(30) Foreign Application Priority Data

Nov. 1, 2005    (JP)    ............... 2005-318212

(51) Int. Cl.
*G11B 7/00*    (2006.01)

(52) U.S. Cl. .................................. 369/30.23

(58) Field of Classification Search ........................ None
See application file for complete search history.

(56) References Cited

U.S. PATENT DOCUMENTS

| | | | |
|---|---|---|---|
| 5,537,217 A | 7/1996 | Kajita et al. | |
| 6,330,394 B1 | 12/2001 | Itoi | |
| 7,610,434 B2 * | 10/2009 | Saito et al. | .................. 711/103 |

FOREIGN PATENT DOCUMENTS

| | | |
|---|---|---|
| JP | 10-257437 | 9/1998 |
| JP | 2001-266475 | 9/2001 |
| JP | 2003-331524 | 11/2003 |
| WO | WO 2005050453 A1 * | 6/2005 |

OTHER PUBLICATIONS

Japanese Office Action for Application No. 2005-318212, Mailed Jul. 9, 2010 w/English Translation, 5 pges.

* cited by examiner

*Primary Examiner*—Joseph Haley
(74) *Attorney, Agent, or Firm*—Oblon, Spivak, McClelland, Maier & Neustadt, L.L.P.

(57) ABSTRACT

According to the present invention, there is provided a recording and reproducing apparatus including: a reproduction memory that stores compressed data read out on a sector basis from a recording medium containing the compressed data compression-coded on a block basis; a recording memory that records on a sector basis a desired part of the compressed data stored in the reproduction memory; a reproduction unit that decompression-decodes on a block basis the compressed data read out from the reproduction memory or the recording memory; and a recording unit that, in response to designation of the compressed data from a desired sector onward as the compressed data to be recorded in the recording memory, detects a first-encountered sector that includes the start position of the block in the compressed data from the designated sector onward after the start position of the designated sector, and records the compressed data from the detected sector onward in the recording memory.

8 Claims, 10 Drawing Sheets

RECORDING AND REPRODUCING APPARATUS AND RECORDING METHOD

CROSS REFERENCE TO RELATED APPLICATIONS

This application is based upon and claims benefit of priority under 35 USC 119 from the Japanese Patent Application No. 2005-318212, filed on Nov. 1, 2005, the entire contents of which are incorporated herein by reference.

BACKGROUND OF THE INVENTION

The present invention relates to a recording and reproducing apparatus and a recording method.

These years, when audio data is recorded on a recording medium such as a compact disc (CD), the audio data is subjected to compression-coding to reduce the data amount before being recorded on the recording medium. This saves the memory space of the recording medium.

When reproduced, the compressed audio data read out from the recording medium is first stored in reproduction memory. The compressed audio data is then read out from the reproduction memory and decompression-decoded, so that the original audio data is reconstructed and output.

This type of apparatus, during the reproduction of the audio data, responds to a user instruction by clipping out part of the compressed audio data stored in the reproduction memory and recording the clipped compressed audio data in recording memory as well.

Then, according to a user instruction, the apparatus reads out the clipped compressed audio data from the recording memory to decompression-decode it and output it. This allows the user to use desired part of the audio data as, for example, alarm data for wake-up.

When the apparatus clips out part of the compressed audio data stored in the reproduction memory and records the clipped compressed audio data in the recording memory by copying it to the recording memory, the apparatus records the clipped compressed audio data in sectors, which are the units used for reading out the compressed audio data from the recording medium.

On the other hand, when the apparatus reads out the clipped compressed audio data from the recording memory and decompression-decodes the clipped compressed audio data, the apparatus performs the decompression decoding in blocks, which are the units used for the compression coding of the audio data. That is, the apparatus requires the compressed audio data for at least one block when performing the decompression decoding: the apparatus cannot decompression-decode those data parts that contain compressed audio data for less than one block.

Since a sector and a block differ in size (data length), the boundaries between adjacent sectors and the boundaries between adjacent blocks in the compressed audio data do not align with each other. For example, the block size may be larger than the sector size.

Therefore, when sectors constituting the compressed audio data intended for recording are recorded in the recording memory, there may be a case where a recorded block expanding over the first sector intended for recording and its immediately preceding and following sectors lacks data for the first part of the block. Then, this block cannot be decompression-decoded.

Thus, there has been a problem that, although a sector consisting of only part of a block incapable of decompression decoding is recorded in the recording memory, the block recorded for that sector cannot be decompression-decoded, and the memory capacity of the recording memory is wasted.

A document related to an optical disc apparatus is listed below.

Japanese Patent Laid-Open No. 2003-331524

SUMMARY OF THE INVENTION

A recording and reproducing apparatus according to an aspect of the present invention includes:

a reproduction memory that stores compressed data read out on a sector basis from a recording medium containing the compressed data compression-coded on a block basis;

a recording memory that records on a sector basis a desired part of the compressed data stored in the reproduction memory;

a reproduction unit that decompression-decodes on a block basis the compressed data read out from the reproduction memory or the recording memory; and a recording unit that, in response to designation of the compressed data from a desired sector onward as the compressed data to be recorded in the recording memory, detects a first-encountered sector that includes the start position of the block in the compressed data from the designated sector onward after the start position of the designated sector, and records the compressed data from the detected sector onward in the recording memory.

A recording method according to an aspect of the present invention includes:

reading out compressed data on a sector basis from a recording medium containing the compressed data compression-coded on a block basis and storing the compressed data in a reproduction memory; and detecting a first-encountered sector that includes the start position of the block in the compressed data from a designated sector onward after the start position of the designated sector, when a desired part of the compressed data stored in the reproduction memory is recorded on a sector basis in a recording memory, in response to designation of the compressed data from a desired sector onward as the compressed data to be recorded in the recording memory, and recording the compressed data from the detected sector onward on a sector basis in the recording memory.

A recording method according to an aspect of the present invention includes:

reading out compressed data on a sector basis from a recording medium containing the compressed data compression-coded on a block basis and storing the compressed data in a reproduction memory; and detecting the start position of a block closest to the start position of a designated sector in the compressed data from the designated sector onward, when a desired part of the compressed data stored in the reproduction memory is recorded in a recording memory, in response to designation of the compressed data from a desired sector onward as the compressed data to be recorded in the recording memory, and recording the compressed data from the detected position onward in the recording memory.

DETAILED DESCRIPTION OF THE INVENTION

Embodiments of the present invention will be described below with reference to the drawings.

(1) First Embodiment

Figure 1:
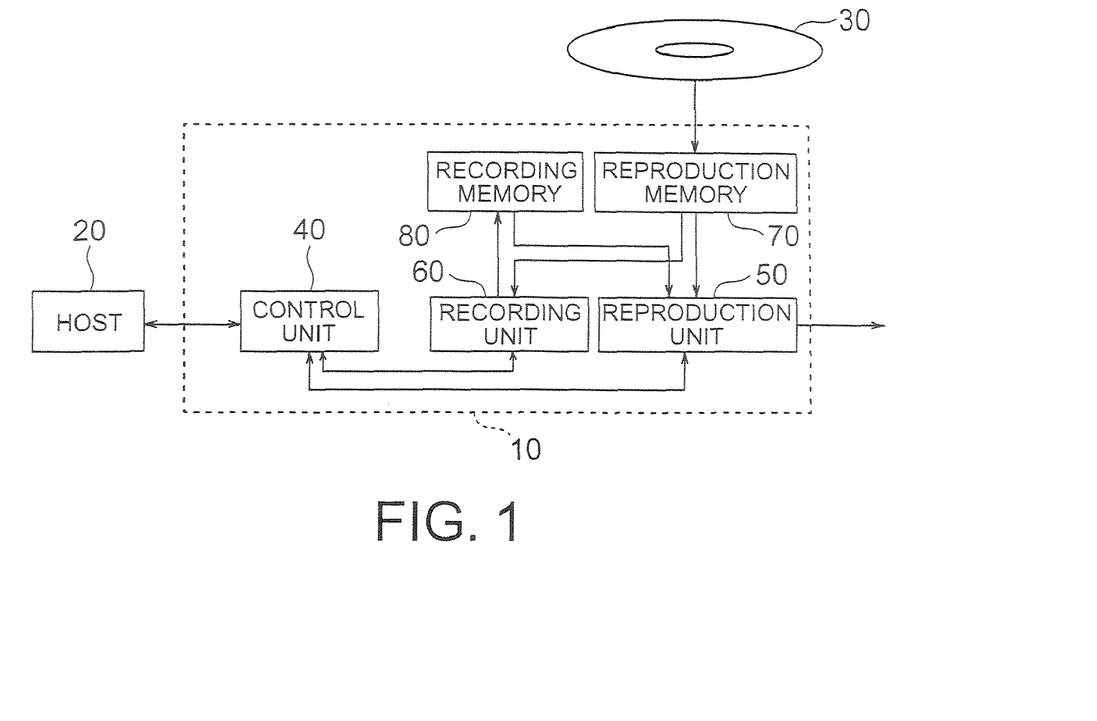
FIG. 1 is a block diagram showing a configuration of a recording and reproducing apparatus according to a first embodiment of the present invention.
Figure 2:
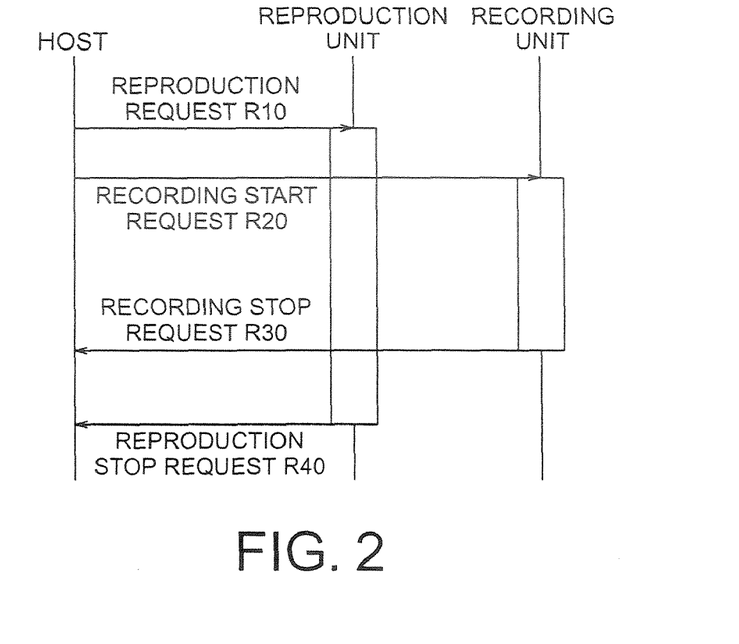
FIG. 2 is a diagram describing a recording and reproducing sequence in the recording and reproducing apparatus.

FIG. 1 shows a configuration of a recording and reproducing apparatus 10 according to a first embodiment of the present invention, and FIG. 2 shows a recording and reproducing sequence in the recording and reproducing apparatus 10. A recording medium 30 may be a medium such as a CD, DVD, or HD. When audio data is recorded on the recording medium 30, the audio data is subjected to compression-coding to reduce the data amount before being recorded on the recording medium 30. This saves the memory space of the recording medium 30.

When a user instructs a host 20 to perform reproduction and the host 20 provides a reproduction request R10 (FIG. 2) to a control unit 40 of the recording and reproducing apparatus 10, the control unit 40 controls operations of a reproduction unit 50 to perform reproduction operations.

Specifically, the reproduction unit 50 reads out compressed audio data from the recording medium 30 and first stores the read-out compressed audio data in reproduction memory 70. The reproduction unit 50 then reads out the compressed audio data from the reproduction memory 70 and decompression-decodes the read-put compressed audio data with an internal decoder. Thus, the reproduction unit 50 reconstructs the original audio data and output it to the outside.

Meanwhile, when a recording start request R20 (FIG. 2) is received from the host 20, the control unit 40 controls operations of a recording unit 60 to perform recording operations.

Specifically, the recording unit 60 determines a sector from which the recording is started in the compressed audio data stored in the reproduction memory 70 based on the recording start request R20. The recording unit 60 records the compressed audio data from the determined sector onward by sequentially copying the compressed audio data to a recording memory 80 on a sector basis.

On completion of recording the compressed audio data in all areas of the recording memory 80, the recording unit 60 sends a recording stop request R30 to the host 20 via the control unit 40. Since the recording memory 80 has a small memory capacity, the compressed audio data is recorded in all areas of the recording memory 80 as described above.

In this manner, during the reproduction of the audio data, the recording and reproducing apparatus 10 responds to a user instruction by clipping out part of the compressed audio data stored in the reproduction memory 70 and recording the clipped compressed audio data by copying it to the recording memory 80.

Thereafter, the reproduction unit 50 sends a reproduction stop request R40 to the host 20 via the control unit 40 at a desired point of time and stops the reproduction operations.

When the user instructs the host 20 to reproduce the clipped compressed audio data and the host 20 provides a reproduction request for the clipped compressed audio data, the control unit 40 of the recording and reproducing apparatus 10 controls operations of the reproduction unit 50 to perform reproduction operations for the clipped compressed audio data.

Specifically, the reproduction unit 50 reads out the clipped compressed audio data from the recording memory 80 to decompression-decode the read-out clipped compressed audio data and output it to the outside. This allows the user to use desired part of the audio data as, for example, alarm data for wake-up.

Figure 3:
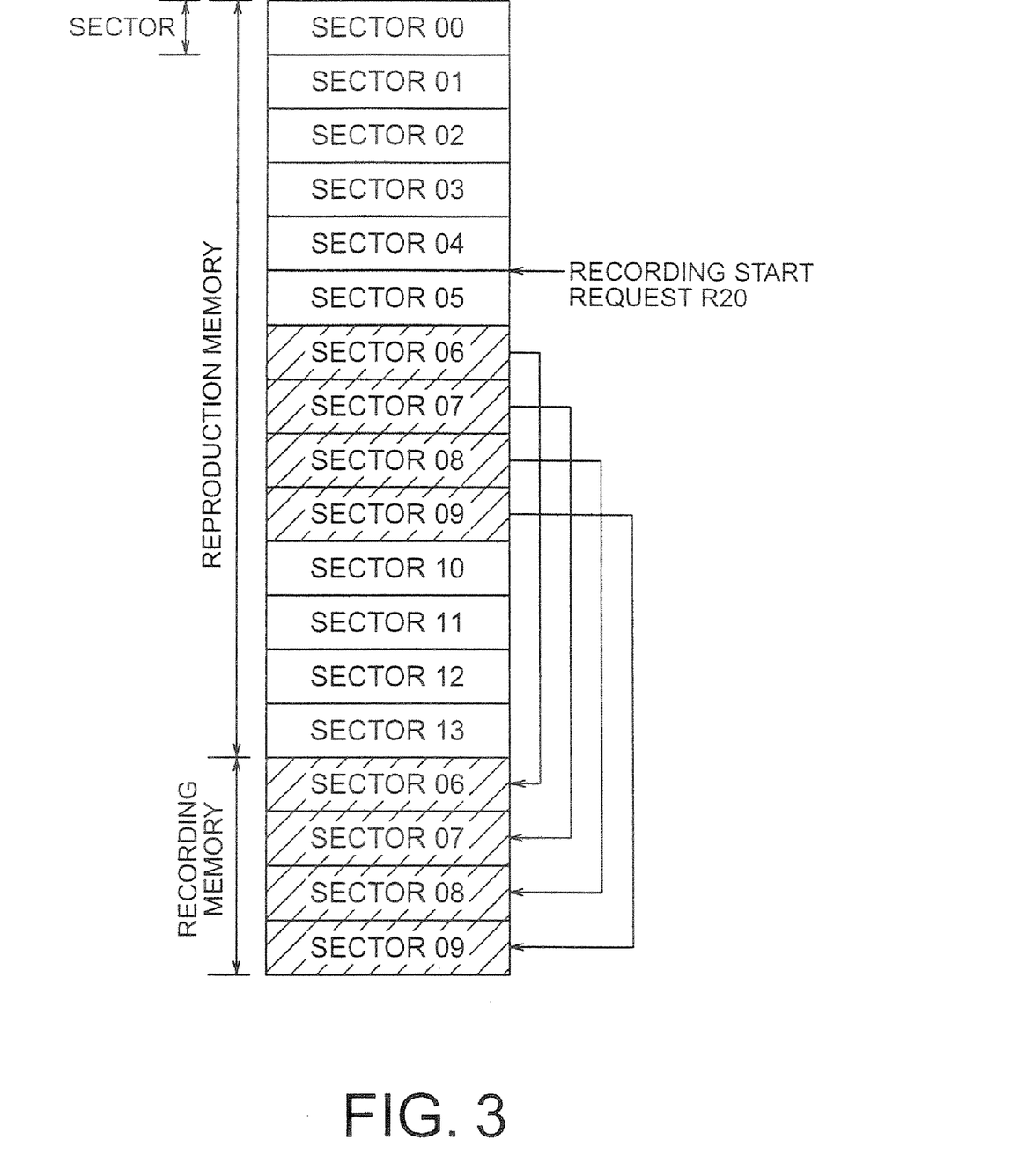
FIG. 3 is a diagram describing copying compressed audio data according to the first embodiment.
Figure 4:
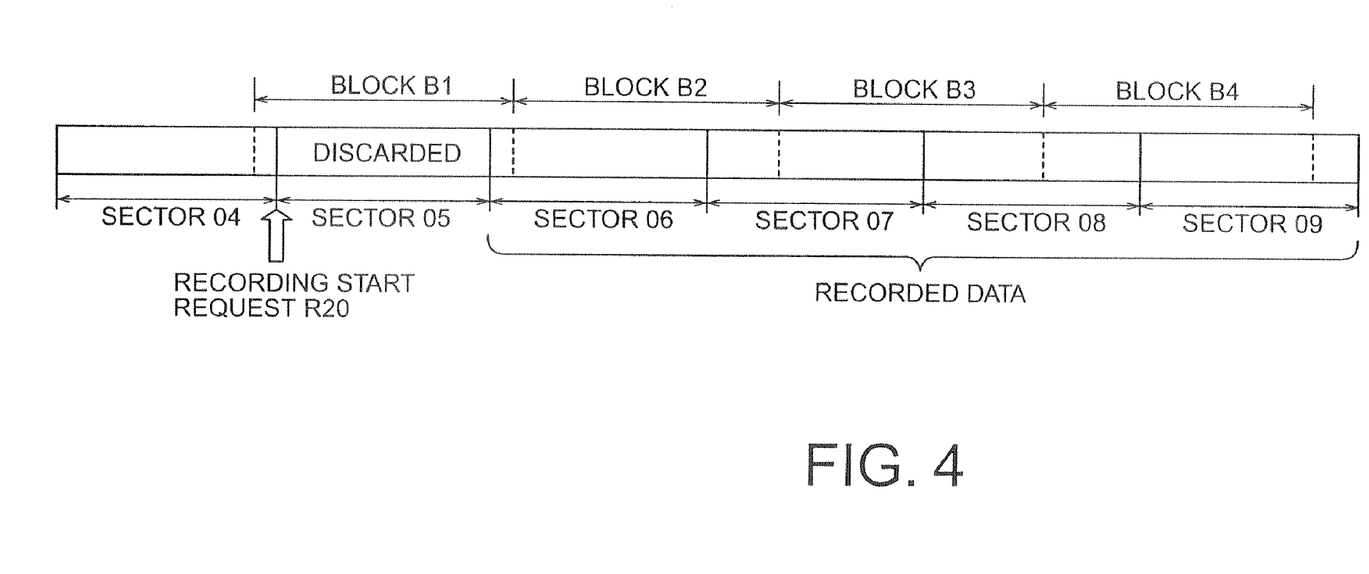
FIG. 4 is a diagram describing the relationship between sectors and blocks according to the first embodiment.

Now, FIG. 3 shows clipping out part of the compressed audio data stored in the reproduction memory 70 and recording the clipped compressed audio data by copying it on a sector basis to the recording memory 80 based on the recording start request R20. FIG. 4 shows the relationship between sectors and blocks when part of the compressed audio data stored in the reproduction memory 70 is clipped out.

FIG. 4 shows the case where the recording start request R20 is provided requesting that the compressed audio data from a sector 05 onward stored in the reproduction memory 70 should be recorded in the recording memory 80, and where a block B1 recorded in the sector 05 extends over sectors 04 to 06.

In this case, even if the compressed audio data from the sector 05 onward is recorded in the recording memory 80, the recorded block B1 lacks data for the first part thereof. Then, the block B1 cannot be decompression-decoded.

Therefore, in this embodiment, the compressed audio data from the sector 06 onward is recorded in the recording memory 80 while the sector 05 is not recorded in the recording memory 80. In this manner, since the sector 05 consisting of only part of the block B1 incapable of decompression decoding is not recorded in the recording memory 80, the memory capacity of the recording memory 80 can be effectively utilized.

In this embodiment, as shown in FIG. 3, the recording memory 80 has the memory capacity capable of recording the compressed audio data for four sectors. Therefore, recording the compressed audio data from the sector 05 onward in the recording memory 80 would mean recording the compressed audio data for the sectors 05 to 08 in the recording memory 80.

In that case, both the blocks B1 and B4 would be recorded with part of their data lacking. As a result, only the blocks B2 and B3 would be able to be decompression-decoded.

In contrast, in this embodiment, the compressed audio data from the sector 06 onward is recorded in the recording memory 80. Therefore, the compressed audio data for the sectors 06 to 09 can be recorded in the recording memory 80.

In this case, the blocks B2 to B4 can be decompression-decoded. Thus, the number of blocks capable of decompression decoding can be increased, and the memory capacity of the recording memory 80 can be effectively utilized.

Figure 5:
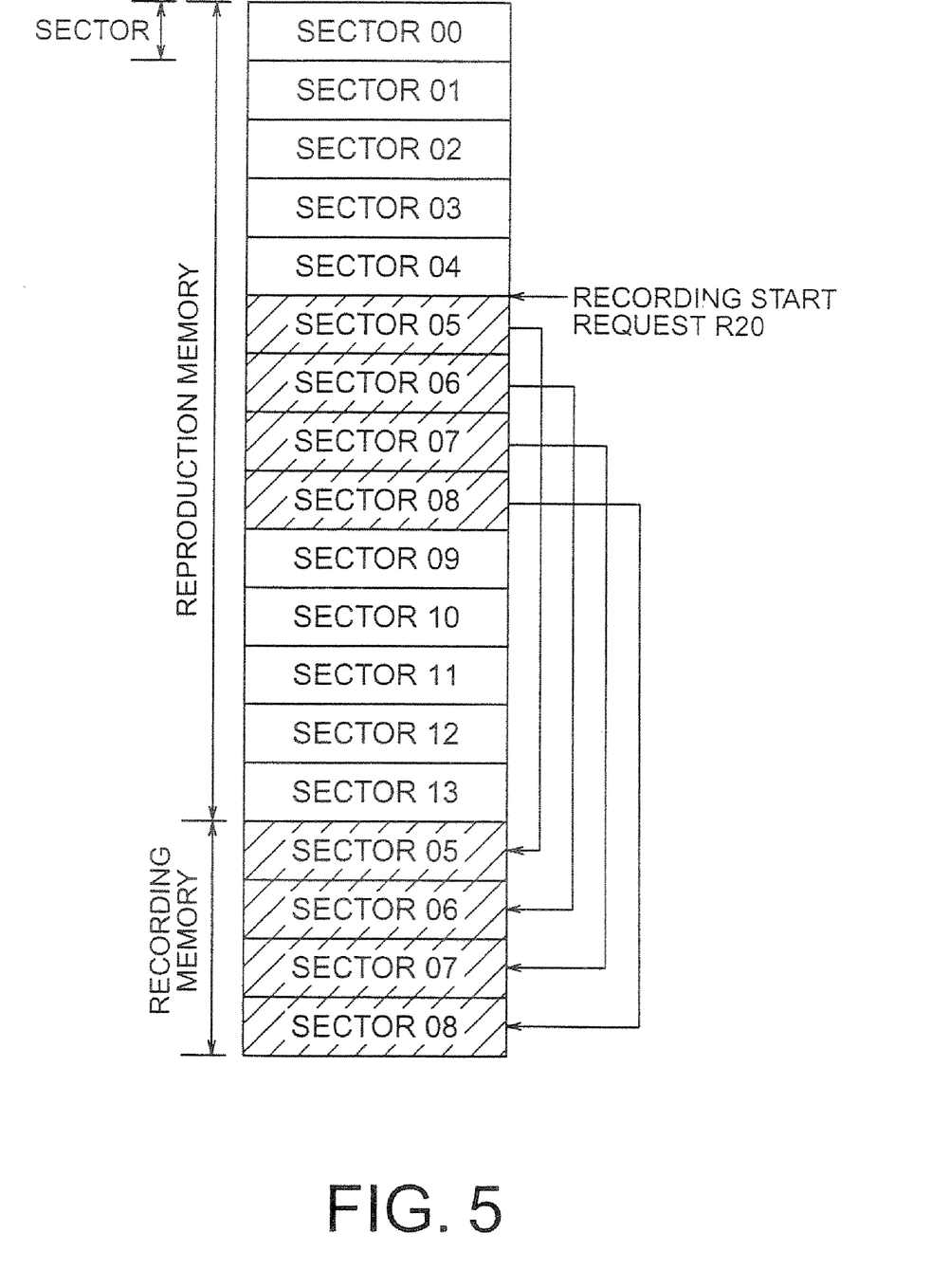
FIG. 5 is a diagram describing copying compressed audio data according to a comparative example.
Figure 6:
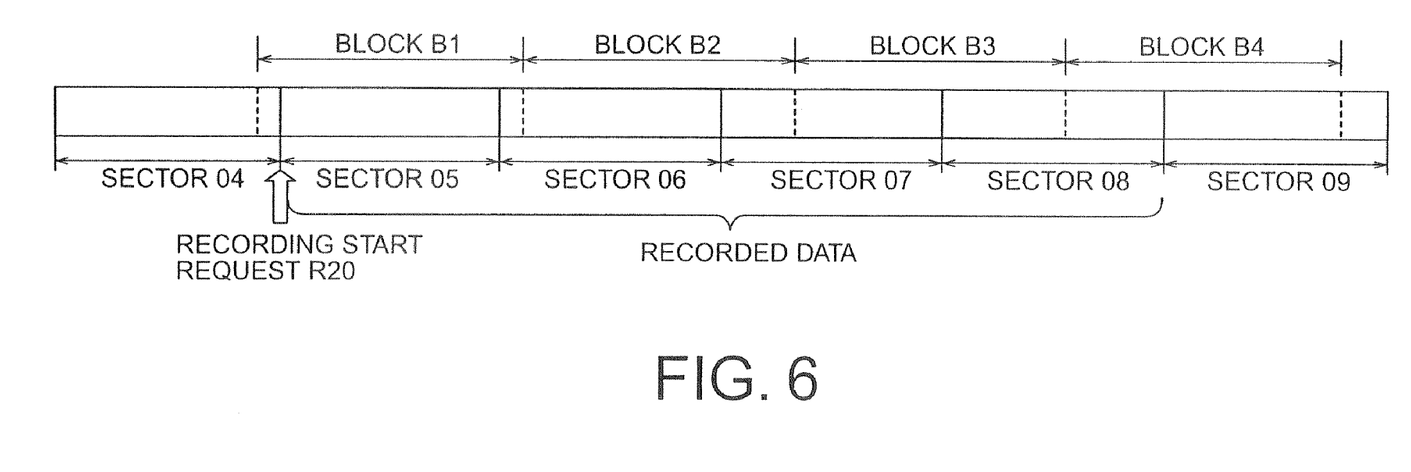
FIG. 6 is a diagram describing the relationship between sectors and blocks according to the comparative example.

As a comparative example, FIG. 5 shows recording the compressed audio data for the sectors 05 to 08 by copying it to the recording memory 80, and FIG. 6 shows the relationship between sectors and blocks in this comparative example.

In this comparative example, even if the compressed audio data for four sectors, i.e., the sectors 05 to 08 is recorded in the recording memory 80, only the compressed audio data for the blocks B2 and B3 can be decompression-decoded. Compared to the present embodiment capable of decompression decoding of the blocks B2 to B4, the memory capacity of the recording memory 80 is wasted.

Figure 7:
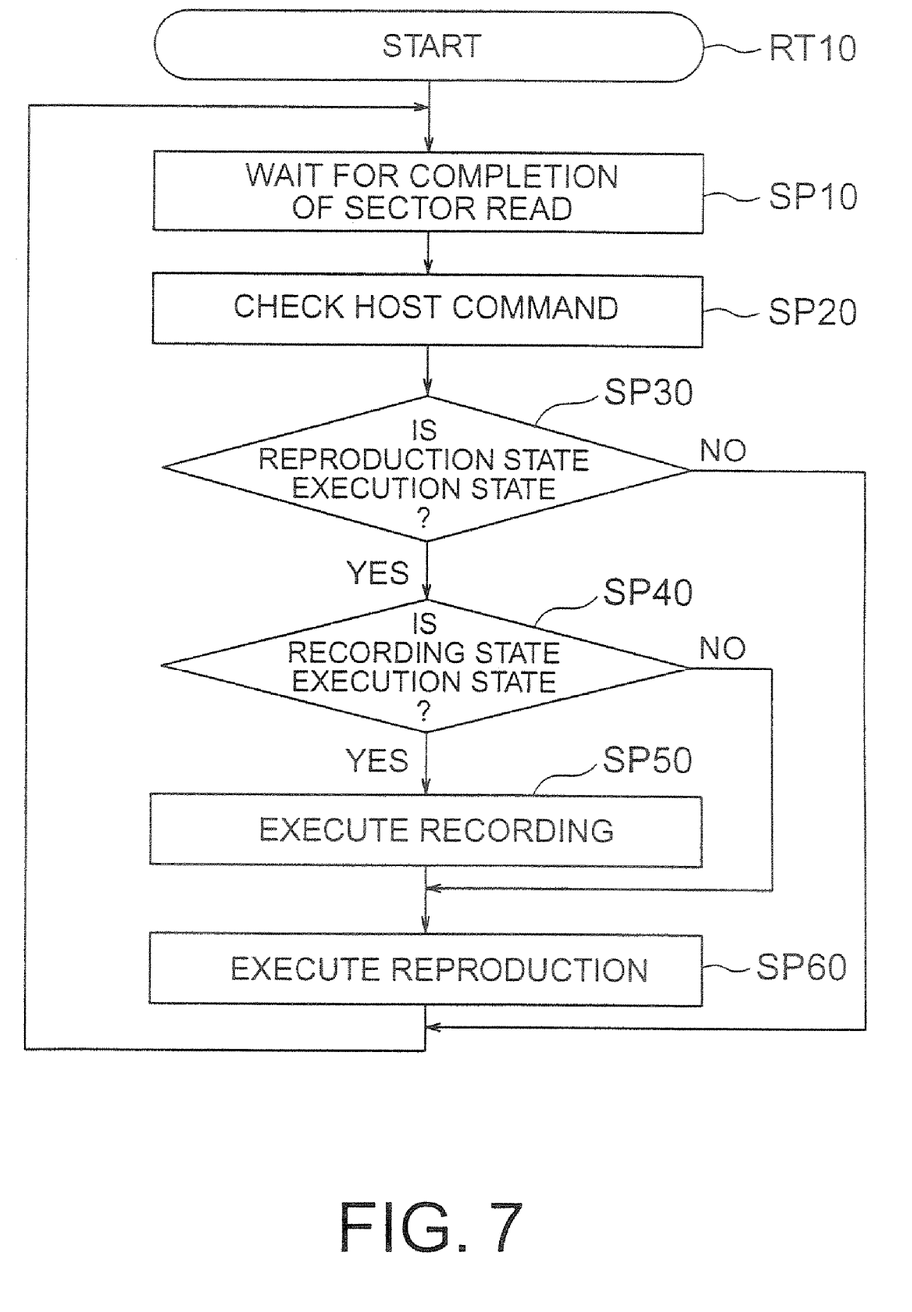
FIG. 7 is a flowchart showing a reproduction procedure according to the first embodiment.

Now, FIG. 7 shows a reproduction procedure RT10 according to this embodiment. In FIG. 7, on entering the reproduction procedure RT10, the control unit 40 sequentially reads out the compressed audio data from the recording medium 30 on a sector basis and waits until the compressed audio data is accumulated in the reproduction memory 70 in step SP10.

Once the compressed audio data is accumulated in the reproduction memory 70, the control unit 40 proceeds to step SP20 to check a command provided by the host 20. If the reproduction request R1 is provided, the control unit 40 updates the reproduction state of the recording and reproducing apparatus 10 to the execution state. If the recording start request R20 is provided, the control unit 40 updates the recording state of the recording and reproducing apparatus 10 to the execution state.

In step SP30, the control unit 40 determines whether or not the reproduction state is the execution state. If the step SP30 results in YES, the control unit 40 proceeds to step SP40 to determine whether or not the recording state is the execution state.

If the step SP40 results in YES, the control unit 40 proceeds to step SP50. The control unit 40 controls operations of the recording unit 60 to clip out a target sector from the compressed audio data stored in the reproduction memory 70 and record the clipped sector by copying it to the recording memory 80.

In step SP60, the control unit 40 controls operations of the reproduction unit 50 to read out the above-mentioned target sector from the compressed audio data stored in the reproduction memory 70 and sequentially decompression-decode it. Thus, the original audio data is reconstructed and output to the outside. The decompression-decoding is performed by obtaining the compressed audio data for one block.

The control unit 40 returns to step SP10 to transition to the waiting state, where the control unit 40 waits until the compressed audio data for one sector is read out from the recording medium 30 and stored in the reproduction memory 70. Once the compressed audio data for one sector is read out from the recording medium 30 and stored in the reproduction memory 70, the control unit 40 proceeds to step SP20 to repeat the above-described operations.

If the step SP40 results in NO, the control unit 40 proceeds to step SP60 to cause the reproduction operations without causing the recording operations. If step SP30 results in NO, the control unit 40 returns to step SP10 to remain in the waiting state without causing the recording and reproduction operations.

Figure 8:
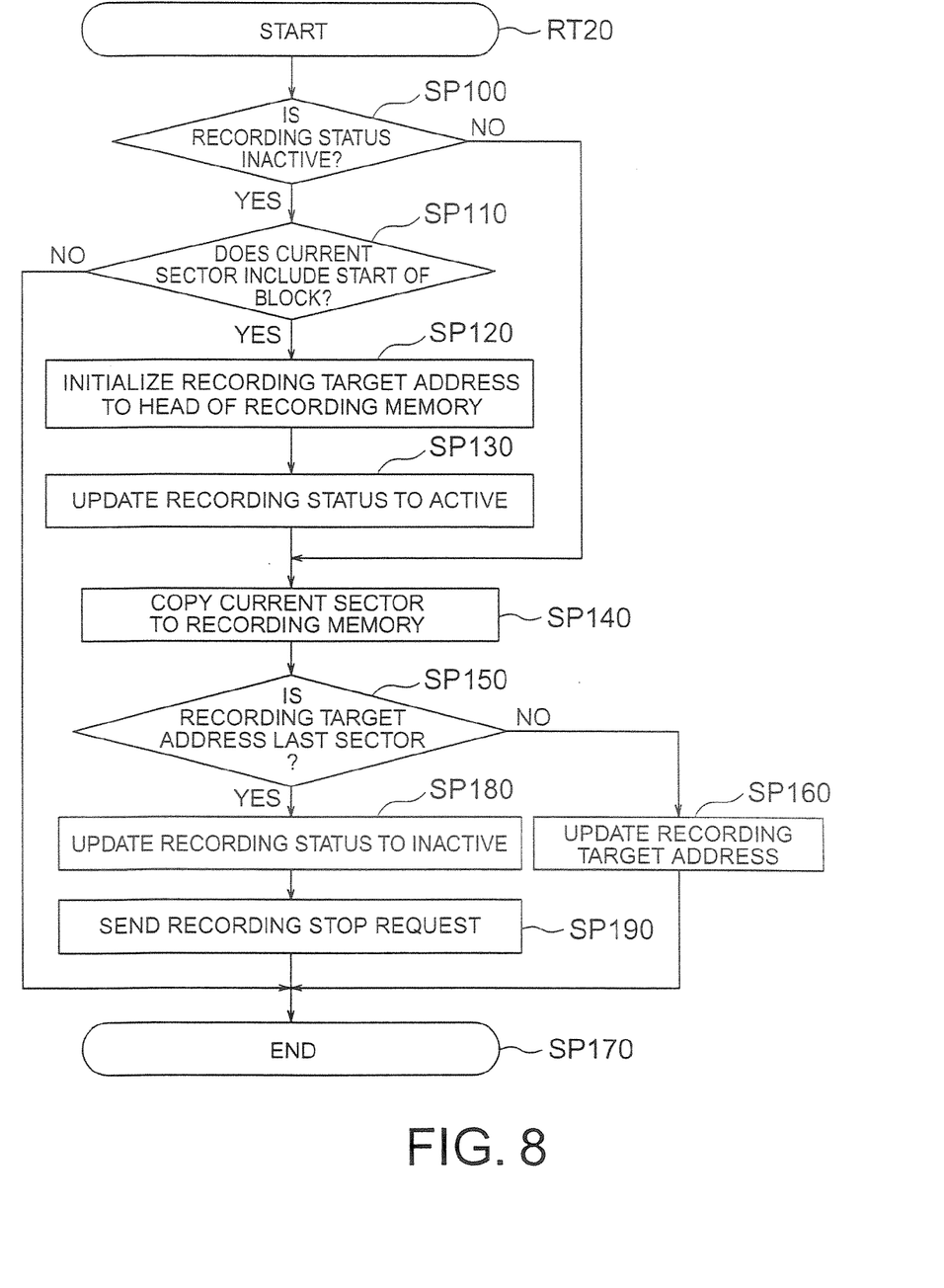
FIG. 8 is a flowchart showing a recording procedure according to the first embodiment.

Now, FIG. 8 shows a recording procedure RT20 according to the first embodiment performed in step SP50 in the reproduction procedure RT10 (FIG. 7). In FIG. 8, on entering the recording procedure RT20, the recording unit 60 proceeds to step SP100 to determine whether or not the recording status is the inactive status.

If the step SP100 results in YES, it means that the recording unit 60 has not yet started recording. The recording unit 60 then proceeds to step SP110 to determine whether or not a sector intended for recording (hereafter referred to as a current sector) includes the start of a block.

If the step SP110 results in NO, it means that the start position of a block is not in the range from the start position to the end position of the current sector. The recording unit 60 then proceeds to step SP170 to terminate the procedure RT20 without recording the current sector in the recording memory 80.

On the other hand, if step SP110 results in YES, it means that the start position of a block is in the range from the start position to the end position of the current sector. The recording unit 60 then proceeds to step SP120 to initialize the recording target address to the head of the recording memory 80.

The recording unit 60 updates the recording status to the active status in step SP130 and proceeds to the next step SP140 to record the current sector by copying the current sector to the recording memory 80.

If the step SP100 results in NO, it means that a sector including the start of a block has already been detected and the recording is being executed. The recording unit 60 then proceeds to step SP140 to record the current sector by copying the current sector to the recording memory 80.

In step SP150, the recording unit 60 determines whether or not the recording target address at which the current sector has been recorded is the last sector in the recording memory 80. If the step SP150 results in NO, the recording unit 60 proceeds to step SP160 to update the recording target address to the next sector in the recording memory 80, and proceeds to step SP170 to terminate the procedure RT20.

On the other hand, if step SP150 results in YES, the recording unit 60 proceeds to step SP180 to update the recording status to the inactive status. In step SP190, the recording unit 60 sends the recording stop request R40 to the host 20 and proceeds to step SP170 to terminate the procedure RT20.

In this manner, a first-encountered sector that includes the start position of a block is detected in the compressed audio data from the sector intended for recording onward, and the compressed audio data from the detected sector onward is recorded in the recording memory 80. This allows effective utilization of the memory capacity of the recording memory 80.

(2) Second Embodiment

Figure 9:
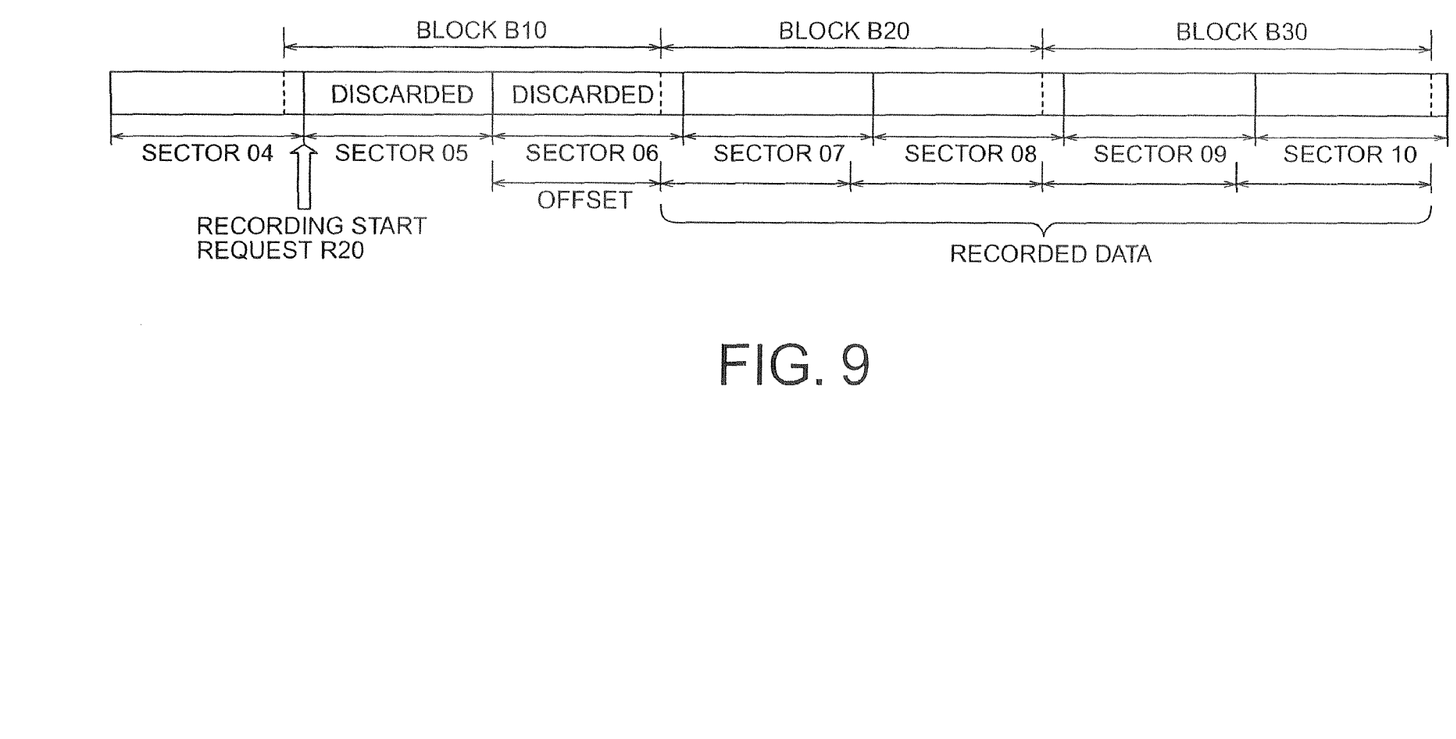
FIG. 9 is a diagram describing the relationship between sectors and blocks according to a second embodiment.

FIG. 9 shows the relationship between sectors and blocks in the case where the compressed audio data is clipped out and recorded according to a second embodiment of the present invention. FIG. 9 shows the case where the recording start request R20 is provided requesting that the compressed audio data from the sector 05 onward in the compressed audio data stored in the reproduction memory 70 should be recorded in the recording memory 80, and where a block B10 recorded in the sector 05 extends over the sectors 04 to 06.

In this case, as in the first embodiment, even if the compressed audio data from the sector 05 onward is recorded in the recording memory 80, the recorded block B10 lacks data for the first part thereof. Then, the block B10 cannot be decompression-decoded.

Therefore, in this embodiment, the sector 05 is again not recorded in the recording memory 80. In addition to this, for the sector 06, only data from the start position of a block B20 capable of decompression-decoding is recorded in the recording memory 80. Subsequently, the compressed audio data from the sector 07 onward is sequentially recorded in the recording memory 80. Thus, the compressed audio data from the block B20 onward is recorded in the recording memory 80 while the block B10 incapable of decompression-decoding is not recorded in the recording memory 80.

In this manner, according to this embodiment, the entire block B10 incapable of decompression-decoding is not recorded in the recording memory 80. This allows further effective utilization of the memory capacity of the recording memory 80 compared to the first embodiment, in which part of the block B1 incapable of decompression-decoding (FIG. 4) is recorded.

In this embodiment, the last sector 10 cannot be entirely recorded in the recording memory 80 because part of the sector 06 is recorded in the recording memory 80. Therefore, when the sector 10 is recorded in the recording memory 80, the recording capacity is adjusted so that the data part of the sector 10 corresponding to the block B30 is recorded.

In this manner, according to this embodiment, only the blocks B20 and B30 capable of decompression-decoding can be recorded in the recording memory 80. This allows further effective utilization of the memory capacity of the recording memory 80 compared to the first embodiment.

Figure 10:
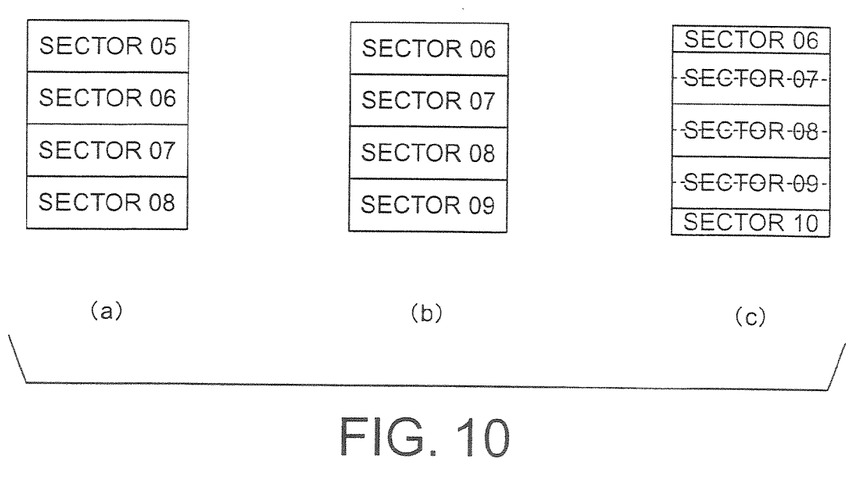
FIG. 10 is a diagram describing sector arrangements with which part of the compressed audio data is recorded in recording memory.

FIG. 10 shows sector arrangements with which part of the compressed audio data is recorded in the recording memory 80. FIG. 10(a) shows a sector arrangement according to the comparative example (FIGS. 5 and 6), FIG. 10(b) shows a sector arrangement according to the first embodiment (FIGS. 3 and 4), and FIG. 10(c) shows a sector arrangement according to the second embodiment (FIG. 9).

Figure 11:
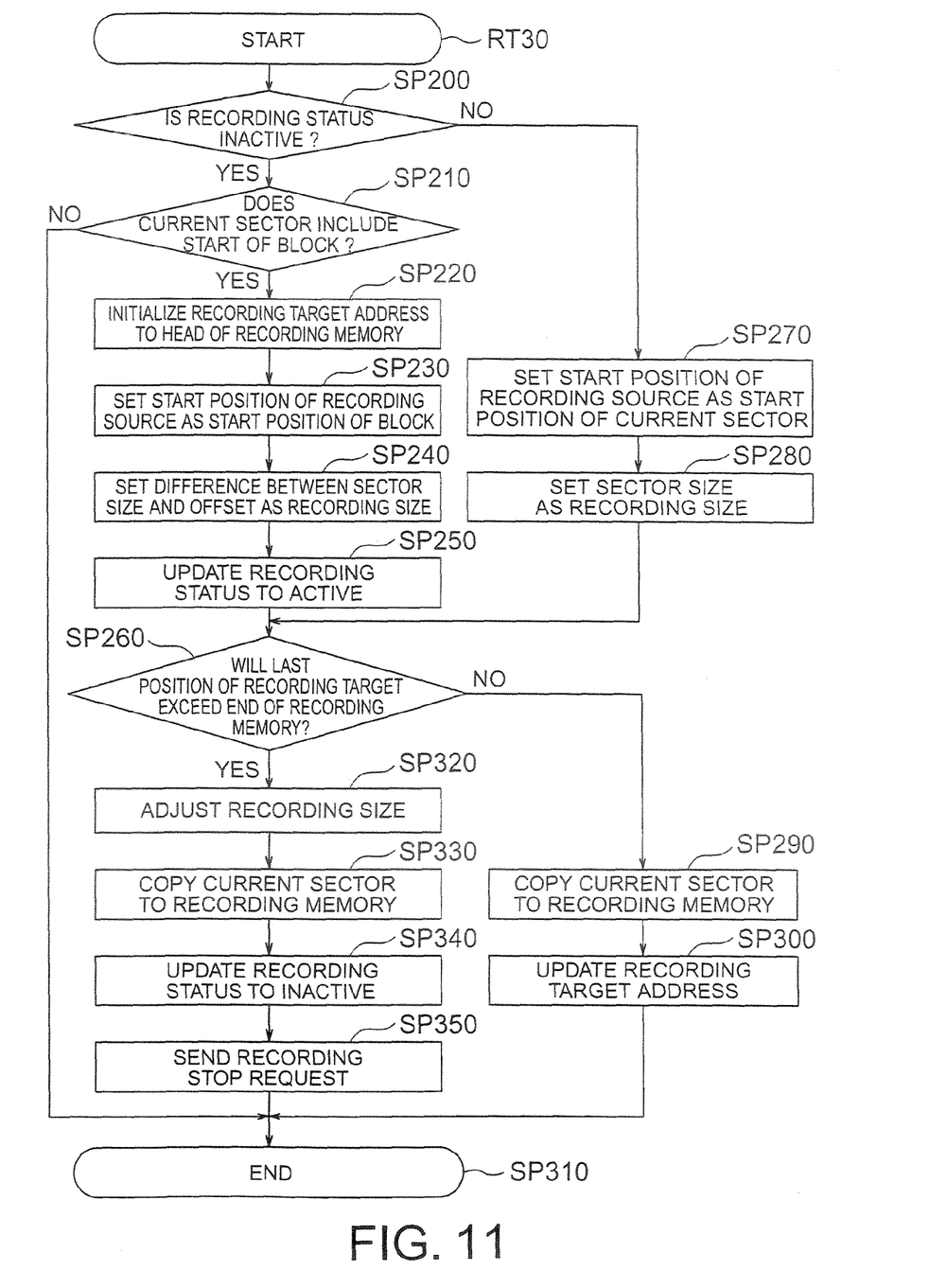
FIG. 11 is a flowchart showing a recording procedure according to the second embodiment.

Now, FIG. 11 shows a recording procedure RT30 according to the second embodiment performed in step SP50 in the reproduction procedure RT10 (FIG. 7). In FIG. 11, on entering the recording procedure RT30, the recording unit 60 proceeds to step SP200 to determine whether or not the recording status is the inactive status.

If the step SP200 results in YES, it means that the recording unit 60 has not yet started recording. The recording unit 60 then proceeds to step SP210 to determine whether or not a sector intended for recording (hereafter referred to as a current sector) includes the start of a block.

If the step SP210 results in NO, it means that the start position of a block is not in the range from the start position to the end position of the current sector. The recording unit 60 then proceeds to step SP310 to terminate the procedure RT30 without recording the current sector in the recording memory 80.

On the other hand, if step SP210 results in YES, it means that the start position of a block is in the range from the start position to the end position of the current sector. The recording unit 60 then proceeds to step SP220 to initialize the recording target address to the head of the recording memory 80.

In step SP230, the recording unit 60 sets the start position of the recording source data as the start position of the block. In the next step SP240, the recording unit 60 sets the difference between the sector size and the offset from the start position of the current sector and the start position of the block as the recording size. In step SP250, the recording unit 60 updates the recording status to the active status and proceeds to the next step SP260.

If the step SP200 results in NO, it means that a sector including the start of a block has already been detected and the recording is being executed. The recording unit 60 then proceeds to step SP270 to set the start position of the recording source data as the start position of the current sector. In the next step SP280, the recording unit 60 sets the sector size as the recording size and proceeds to step SP260.

In step SP260, the recording unit 60 determines whether or not the last position of the recording target will exceed the end of the recording memory 80 if the current sector is recorded in the recording memory 80.

If this step SP260 results in NO, the recording unit 60 proceeds to step SP290 to record the current sector by copying the current sector to the recording memory 80. In the next step SP300, the recording unit 60 updates the recording target address in the recording memory 80 to the next sector and proceeds to step SP310 to terminate the procedure RT30.

On the other hand, if step SP260 results in YES, the recording unit 60 proceeds to step SP320 to adjust the recording size of the current sector. In the next step SP330, the recording unit 60 records the current sector with its recording size adjusted by copying the current sector to the recording memory 80.

In step SP340, the recording unit 60 updates the recording status to the inactive status. The recording unit 60 sends the recording stop request R40 to the host 20 in step SP350 and proceeds to step SP310 to terminate the procedure RT30.

In this manner, the start position of a block is detected in the compressed audio data from a sector intended for recording onward, and the compressed audio data from the detected block onward is recorded in the recording memory 80. This allows effective utilization of the memory capacity of the recording memory 80.

The above-described embodiments are only examples and not limitations on the present invention. For example, part of compression-coded image data may be clipped out and recorded in the recording memory 80 instead of the compressed audio data.

What is claimed is:

1. A recording and reproducing apparatus comprising:
    a reproduction memory that stores compressed data read out on a sector basis from a recording medium containing the compressed data compression-coded on a block basis;
    a recording memory that records on a sector basis a desired part of the compressed data stored in the reproduction memory;
    a reproduction unit that decompression-decodes on a block basis the compressed data read out from the reproduction memory or the recording memory; and
    a recording unit that, in response to designation of the compressed data from a desired sector onward as the compressed data to be recorded in the recording memory, detects a first-encountered sector that includes the start position of the block in the compressed data from the designated sector onward after the start position of the designated sector, and records the compressed data from the detected sector onward in the recording memory,
    wherein in response to designation of the compressed data from a desired sector onward as the compressed data to be recorded in the recording memory, the recording unit detects the start position of the block closest to the start position of the designated sector in the compressed data from the designated sector onward, and records the compressed data from the detected position onward in the recording memory.

2. The recording and reproducing apparatus according to claim 1, wherein when the compressed data from the start position of the block onward is recorded in the recording memory, the recording unit records the compressed data from the start position of the block to the end position of a sector that includes the start position of the block, and subsequently sequentially records the compressed data on a sector basis, wherein the last sector is recorded with the recording size adjusted.

3. A recording method comprising:
    reading out compressed data on a sector basis from a recording medium containing the compressed data compression-coded on a block basis and storing the compressed data in a reproduction memory; and detecting the start position of a block closest to the start position of a designated sector in the compressed data from the designated sector onward, when a desired part of the compressed data stored in the reproduction memory is recorded in a recording memory, in response to designation of the compressed data from a desired sector onward as the compressed data to be recorded in the recording memory, and recording the compressed data from the detected position onward in the recording memory, wherein recording the compressed data from the start position of the block onward in the recording memory comprises recording the compressed data from the start position of the block to the end position of a sector that includes the start position of the block, and subsequently sequentially recording the compressed data on a sector basis, wherein the last sector is recorded with the recording size adjusted.

4. The recording method according to claim 3, wherein recording the compressed data from the start position of the block to the end position of the sector that includes the start position of the block comprises recording by setting the start position of the recording source data as the start position of the block and setting the difference between the sector size and the offset from the start position of the recording object sector to the start position of the block as the recording size.

5. The recording method according to claim 3, wherein sequentially recording on a sector basis comprises recording by setting the start position of the recording source data as the start position of a recording object sector and setting the sector size as the recording size.

6. The recording method according to claim 3, wherein recording the last sector comprises recording by adjusting the recording size so that a data part in the last sector corresponding to a block extending over the preceding sector is selectively recorded.

7. The recording method according to claim 3, wherein recording the compressed data from the start position of the block onward in the recording memory comprises:

determining whether or not the last position of a recording target will exceed the end of the recording memory if a recording object sector is recorded in the recording memory; and recording the recording object sector in the recording memory, if it is determined that the last position of the recording target will not exceed the end of the recording memory.

8. The recording method according to claim 3, wherein recording the compressed data from the start position of the block onward in the recording memory comprises:

determining whether or not the last position of a recording target will exceed the end of the recording memory if a recording object sector is recorded in the recording memory; and recording the recording object sector in the recording memory with its recording size adjusted, if it is determined that the last position of the recording target will exceed the end of the recording memory.

* * * * *